Patented Jan. 31, 1928.

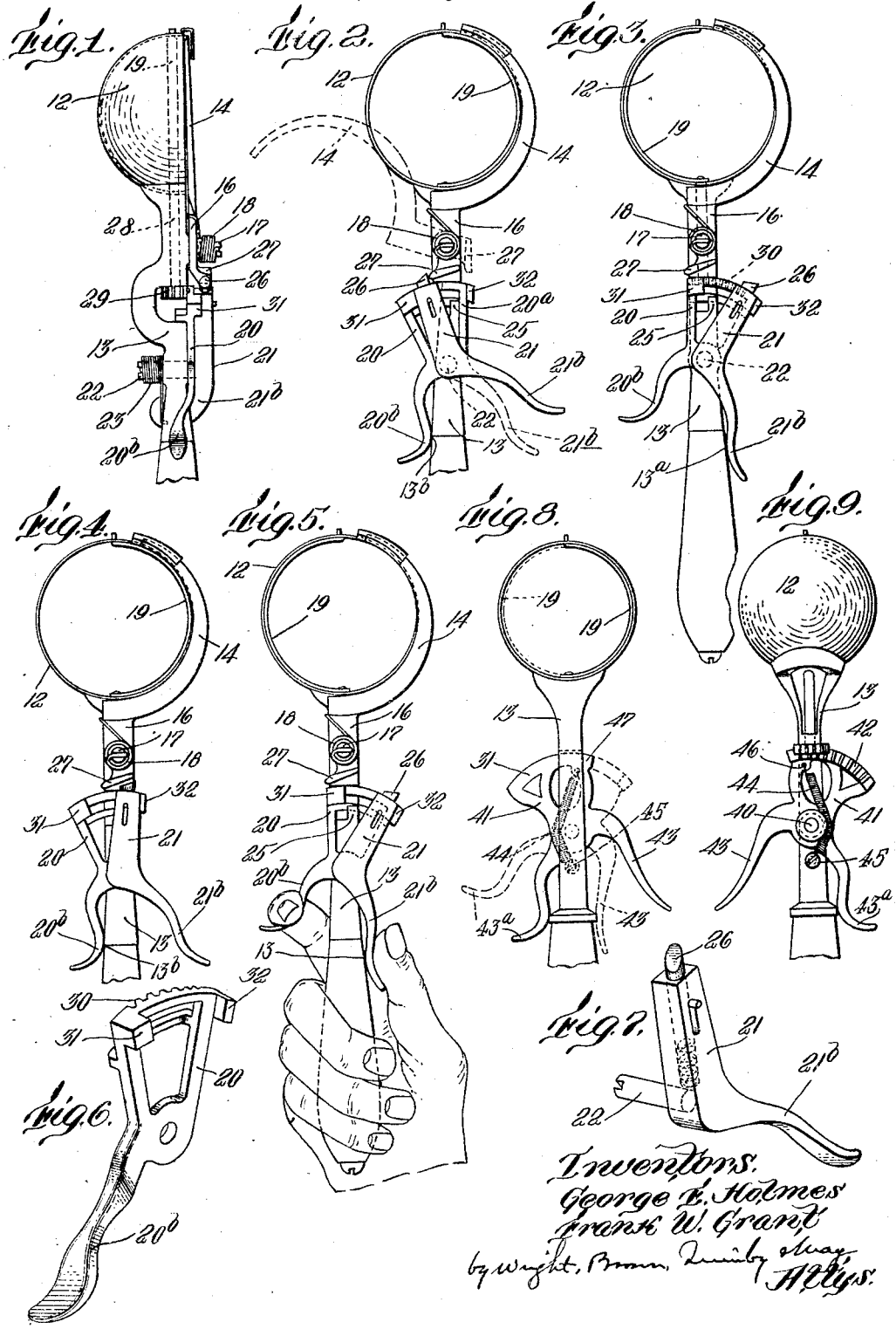

1,657,470

UNITED STATES PATENT OFFICE.

GEORGE E. HOLMES AND FRANK W. GRANT, OF DOVER, NEW HAMPSHIRE.

ICE-CREAM DISHER.

Application filed September 18, 1926. Serial No. 136,270.

The invention relates to a disher for removing ice-cream in a single portion or charge from a container and depositing it in a receptacle for consumption, the disher comprising a bowl and a scraper movable in the bowl to break an adhesion between the charge and the bowl and permit the dumping of the charge. It is at the present time the custom of ice-cream retailers to keep their cream in cold storage and constantly accessible for dispensing in their stores, this custom being made possible in recent years by the "Frigidaire" and other compact refrigerating systems, adapted to be installed in drug stores and other places where ice-cream is served. A temperature of approximately 35° F. is preferred and is usually continuously maintained. The stored cream is, therefore, usually much harder than was the case when the "ice and salt pack" was generally used, so that the operation of dishing the cream for customers is more difficult than formerly.

A disher to meet modern requirements, must have its bowl and handle firmly connected and relatively arranged to prevent breakage of the bowl from the handle by the strain exerted, when the bowl is pressed against hard cream in dishing. The preferred, and at the present time, generally used type of disher, has a hemispherical bowl and a handle fixed to one side of the mouth portion or larger zone of the bowl, and projecting therefrom in substantial alinement with said zone.

When the disher is in practically continuous use, the temperature of the bowl approaches that of the ice-cream. This condition often causes quick and strong adherence of the charge to the inner surface of the bowl, so that while the scraper is being moved initially across the bowl to liberate the charge, the latter readheres to the bowl behind the scraper.

The scraper used in the preferred type of disher having a hemispherical bowl, is semi-circular and conforms to the concavity of the inner surface of the bowl, and is journaled at one end in the side of the mouth portion of the bowl opposite the handle and fixed at the opposite end to a rock shaft which is journaled in an elongated bearing in the handle, and is in the same plane as the scraper, the rock-shaft constituting an element of means for operating the scraper. Another element of the operating means is a lever fulcrumed on the handle and operable by pressure of a thumb or finger thereon, to turn the rock-shaft and cause a movement of the scraper across the concave inner surface of the bowl, the rock-shaft being provided with a pinion, and the lever with a rack engaging the pinion. An example of this type of disher is found in our Patent No. 1,188,757, granted June 17, 1916.

In said patented disher and all others of the type above described, of which we are aware, in which a semi-circular scraper is operated by a rock-shaft in the plane of the scraper, the lever has been adapted and arranged to move the scraper in one direction only, to project the scraper and break an adhesion, so that a readherence of the charge to the bowl cannot be broken by a positive return movement or retraction of the lever and scraper, and can be broken only by the action of the spring usually employed in dishers of this type, to yieldingly move the lever in the direction required to turn backward the rock-shaft and retract the scraper.

The object of our invention is to provide an ice-cream disher of the type described, having manually operable means for positively turning the rock-shaft and scraper backward, as well as forward, so that a second adhesion may be quickly broken by a positive backward movement of the scraper.

The invention may be embodied in a disher which includes an oscillatory sickle-shaped cleaver-blade conforming to the edge of the bowl, and adapted to be moved across the bowl and remove surplus material from a charge therein, before the operation of the scraper, or it may be embodied in a disher which includes a scraper, but does not include a cleaver.

Of the accompanying drawings forming a part of this specification,—

Figure 1 is an edge view of a disher embodying the invention, including a cleaver.

Figures 2 and 3 are side views of the same, illustrating different stages of the operation.

Figures 4 and 5 are views similar to Figures 1 and 3, and illustrate the repeated operation of the scraper, without the operation of the cleaver.

Figures 6 and 7 are perspective views, showing the members of the lever shown by the preceding figures, separated from each other.

Figures 8 and 9 are top and bottom views of a disher which does not include a cleaver.

The same reference characters indicate the same parts in all of the figures.

Referring first, to Figures 1 to 7, inclusive, 12 designates the bowl which is substantially hemispherical, and 13 the handle of an ice-cream disher. The handle is attached to one side of the mouth portion or zone of the bowl. A sickle-shaped cleaver 14, conforming to the top edge or circular mouth of the bowl, is provided with a shank 16, formed as a lever, which is fulcrumed to oscillate on a stud 17, fixed to the handle, and is normally held yieldingly in the retracted position shown by full lines in Figures 2, 3, 4 and 5, by a spring 18 coiled on the stud, one end of the spring being fixed to the stud, and the other end to the shank 16.

A substantially semi-circular scraper 19 is journaled to turn within the bowl from the retracted position shown by Figures 2 and 4, to the projected position shown by Figures 3 and 5, and thereby break an adhesion between the bowl and a charge of ice-cream therein, the scraper having at one end a trunnion 19$^a$ journaled in a bearing at the outer side of the bowl, and fixed at its opposite end to a rock-shaft 28, which is journaled in a bearing in the handle 13. Said bearings are in close proximity to the mouth of the bowl.

Fulcrumed on the handle is an operating lever which, in this instance, is adapted as next described, to operate both the cleaver and the scraper.

The lever includes an inner member 20, and an outer member 21, to which is fixed a fulcrum stud 22, journaled in the bearing in the handle 13, the inner member 20 being adapted to oscillate on the fulcrum stud. A spring 23, fixed at one end to the stud, and at the other end to the handle, normally holds the members 20 and 21 in the position shown by Figure 2, a portion 20$^a$ of the member 20 being engaged with a hold-down lug 25 on the handle. The lever members 20 and 21 are provided with arms 20$^b$ and 21$^b$, on which a finger and thumb may bear, as shown by Figure 5, the arm 20$^b$ being a pull arm, and the arm 21$^b$ a push arm, said arms being at opposite sides of the handle. The outer member 21 is provided with a spring-pressed bolt 26, adapted to engage an ear 27 on the cleaver shank 16, and swing the cleaver to the dotted line position shown by Figure 2, said bolt and ear constituting trigger means hereinafter referred to. Torque-transmitting connections are provided between the scraper 19 and the lever member 20, these including the rock-shaft 28, fixed at one end to the scraper and journaled in a bearing in the handle, and a segmental rack 30, formed on the lever member 20.

The outer lever member 21 is adapted to oscillate independently between two abutments 31 and 32, formed on the inner member 20, and is held normally by the controlling spring 23 against the abutment 31, the inner member 20 being at the same time held by the spring against the lever hold-down lug 25, as shown by Figure 2.

In operating the disher after the bowl 12 is charged, the operator first presses on the push arm 21$^b$ to move the outer lever 21 from the position shown by Figure 2, toward that shown by Figure 3. The spring-pressed bolt 26 is thus caused to engage the ear 27 on the cleaver shank and project the cleaver to the dotted line position shown by Figure 2, and then release the cleaver, before the movement of the member 21 is completed. The member 21, at the same time, contacts with the abutment 32 on the member 20, so that in moving to the position shown by Figure 3, it moves the member 20, thus causing, through the torque-transmitting connections, the projection of the scraper 19 from the retracted position shown by Figure 4, to the projected position shown by Figure 3.

In case the charge readheres to the bowl, after the first projection of the scraper, before the charge is dumped, the second adhesion may be broken without operating the cleaver, by the manipulation illustrated by Figures 4 and 5, the operator oscillating the members of the lever in unison between the extreme positions shown by these figures, by pressing alternately on the lever arms 20$^b$ and 21$^b$, without allowing the bolt 26 to engage the ear 27 of the cleaver shank. When the lever members are moved to the positions shown by Figure 4, the scraper is positively retracted, and when they are moved in unison to the positions shown by Figure 5, they act conjointly to cause the projection of the scraper, the cleaver remaining inoperative. Provision is therefore made for repeatedly operating the scraper without operating the cleaver, so that the operator, after leveling the charge by the cleaver, may continue to positively operate the scraper to any desired extent.

A stop ear 12$^a$ on the bowl limits the retracting movement of the cleaver to its normal position.

The disher is provided with stop means limiting the movements of the scraper and lever in each direction, said means including, in this instance, a stop ear 12$^a$ on the bowl, against which the cleaver abuts when retracted, and portions 13$^a$ and 13$^b$ of the handle 13, the pull arm 20$^b$ of the lever being formed to abut against the portion 13$^b$ as shown by Figure 2, and the push arm 21$^b$ being formed to abut against the portion 13$^a$ as shown by Figure 3.

It will be seen that the push arm 21$^b$ of the outer lever member 21, is a scraper-projecting arm engageable by the operator's thumb, to first operate the cleaver through the trigger means, and then positively move the inner member 20 in the direction required to project the scraper through the torque-transmitting connections. It will also be seen that the pull arm 20$^b$ of the inner lever member, is a scraper-retracting arm, supplementing the action of the spring 23 and positively moving the inner lever member 20 in a scraper-retracting direction.

The springs 18 and 23, collectively constitute resilient means normally holding the scraper retracted and the lever member 20 in position to project the scraper.

In the embodiment shown by Figures 8 and 9, the cleaver is omitted, and the lever is composed of a single part, which is manually movable to positively project and positively retract the scraper. The lever is fulcrumed on a stud 40 fixed to the handle, and includes an arm 41 at one side of the fulcrum having a segmental rack 42, a scraper-projecting push arm 43, arranged to receive pressure from the operator's thumb, and a scraper-retracting pull arm 43$^a$ arranged to receive pressure from a finger.

The scraper may be normally held in a retracted position by a spring 44, fixed to the handle at 45, and to the lever at 46. The spring normally presses a stop ear 47 on the lever arm 41, against the handle 13, so that the lever normally holds the scraper retracted through torque-transmitting means similar to that above described. The scraper-retracting pull arm 43$^a$ enables the operator to positively retract the scraper and thereby break a second adhesion. The spring may be omitted if desired.

It will be seen that in each of the illustrated embodiments of the invention, the disher includes a hemispherical bowl, a handle fixed to one side of the mouth portion of the bowl, a semi-circular scraper conforming to the concave inner surface of the bowl and journaled at one end in the mouth portion thereof, a rock-shaft fixed to the scraper and journaled in a bearing in the handle, and provided with a pinion, the scraper being movable entirely across the inner surface of the bowl by a semi-rotation of the rock-shaft, and a lever fulcrumed on the handle and having an arm at one side of the fulcrum provided with a rack meshing with the pinion, and with a push-arm at the opposite side of the fulcrum, adapted to be pushed by a digit of a hand grasping the handle to cause a semi-rotation of the rock-shaft in one direction, and a positive projection of the scraper. This organization of the disher is similar in the features above mentioned, to the general organization of other dishers now in use, for example, the disher disclosed by the Holmes and Grant Patent No. 1,188,757, the disher being adapted to successfully dish hard cream, and having the essential characteristics pointed out in the opening portion of this specification.

In each of said embodiments the disher is distinguished from other dishers of this type heretofore used, by the pull arm 20$^b$ or 43$^a$ constituting an element of the operating lever located beside the element provided by the push-arm 21$^b$ or 43, and adapted to be pulled by another digit of a hand grasping the handle, to cause a positive semi-rotation of the rock-shaft in the opposite direction, and a positive retraction of the scraper.

We claim:

1. An ice-cream disher comprising a hemispherical bowl, a handle fixed to one side of the mouth portion of the bowl, a semi-circular scraper conforming to the concave inner surface of the bowl, and journalled at one end in the mouth portion thereof, a rock shaft fixed to the scraper and journalled in a bearing in the handle, the scraper being movable entirely across the inner surface of the bowl by a semi-rotation of the rock shaft, and mechanism including a member operable by one digit of the hand of the operator while grasping the handle to positively turn the rock shaft in one direction, and a second member operable by another digit of the hand of the operator grasping the handle to positively turn the rock shaft in the opposite direction, whereby the scraper may be positively actuated to initially break an adhesion between the bowl and a frozen charge therein and positively retracted, to break a second adhesion.

2. An ice-cream disher comprising a hemispherical bowl, a handle fixed to one side of the mouth portion of the bowl, a semi-circular scraper conforming to the concave inner surface of the bowl, and journaled at one end in the mouth portion thereof, a rock-shaft fixed to the scraper, and journaled in a bearing in the handle, the scraper being movable entirely across the inner surface of the bowl by a semi-rotation of the rock-shaft, a pinion on the rock-shaft, and an operating lever fulcrumed on the handle and having at one side of the fulcrum a rack meshing with the pinion, and at the opposite side a push-arm and a pull-arm, the push-arm being arranged to be positively pushed by a digit of a hand grasping the handle, while the pull-arm is arranged to be positively pulled by another digit, while the handle is grasped by the hand, the arrangement being such that the scraper may be positively projected by force applied to one of said arms, to initially break an adhesion between the bowl and a frozen charge therein, and positively retracted by force applied to the other arm to break a second adhesion.

3. In an ice-cream disher which includes a bowl having a handle, a scraper adapted to oscillate in the bowl between retracted and projected positions, to break an adhesion between the bowl and a charge therein, and a cleaver adapted to oscillate across the edge of the bowl, and provided with an element of trigger means whereby the cleaver may be projected and released; the disher being characterized by scraper and cleaver-operating mechanism whereby the scraper may be manually and positively moved in each direction to positively break such adhesion, and the cleaver may be manually projected and normally retracted, said mechanism comprising a two-part operating lever fulcrumed on the handle and including an inner member having spaced apart abutments, and an outer member coaxial with the inner member and adapted to bear on said abutments alternately, the outer member being provided with a complemental element of said trigger means, resilient means normally holding the cleaver retracted and the lever in position to project the scraper and cleaver, said means including two independent springs, one connecting the cleaver with the handle, and the other connecting the outer member of the lever with the handle, and torque-transmitting connections between the inner member of the lever and the scraper, the outer lever member having a scraper and cleaver-projecting arm engageable by a digit to first move the outer member to cause the projection and release of the cleaver by said trigger means, and then engage the outer member with the inner member, to cause the projection of the scraper by the torque-transmitting means, the inner lever member having a scraper-retracting arm engageable by a digit to manually and positively retract the scraper, the arrangement being such that the scraper may be repeatedly positively projected and retracted independently of the cleaver, so that an adhesion formed after an initial projection of the scraper may subsequently be broken without operating the cleaver, the disher including stop means limiting the movements of the lever and scraper in each direction.

4. An ice-cream disher comprising a bowl having a handle, a scraper having a rock-shaft adapted to turn in a bearing in the handle and provided with a pinion, the scraper being adapted to oscillate in the bowl between retracted and projected positions, to break an adhesion between the bowl and a charge therein, a cleaver adapted to oscillate across the edge of the bowl and provided with a lever fulcrumed on the handle and having a trigger ear, a two-part operating lever fulcrumed on the handle and including an inner member having spaced apart abutments, a spring-pressed trigger bolt adapted to cooperate with said ear in projecting and releasing the cleaver, a segmental rack engaging said pinion, and a scraper-retracting arm engageable by a digit to manually and positively retract the scraper, the lever including also an outer member coaxial with the inner member, adapted to bear on said abutments alternately, and provided with a scraper and cleaver-projecting arm engageable by a digit to first move the outer member to cause the projection and release of the cleaver by said trigger bolt and ear, and then engage the outer member with the inner member to cause the projection of the scraper by said rack, pinion and rock-shaft, the arrangement being such that the scraper may be repeatedly positively projected and retracted independently of the cleaver, so that an adhesion formed after an initial projection of the scraper may subsequently be broken, without operating the cleaver, the disher including stop means limiting the movements of the lever and scraper in each direction.

In testimony whereof we have affixed our signatures.

GEORGE E. HOLMES.
FRANK W. GRANT.